United States Patent [19]
Talbot et al.

[11] 3,827,160
[45] Aug. 6, 1974

[54] EDUCATIONAL DEVICE

[76] Inventors: William Carl Talbot, 65 Washington Ave., Bernardsville, N.J. 07924; Cornelius Lindsey, 6041 Capri Dr., Cincinnati, Ohio 45224

[22] Filed: May 14, 1973

[21] Appl. No.: 359,715

[52] U.S. Cl............ 35/9 R, 35/31 D, 35/69, 35/73
[51] Int. Cl. ............................ G09b 1/30
[58] Field of Search ........ 35/9 R, 31 R, 31 D, 31 F, 35/31 G, 35 H, 35 J, 69-73

[56] References Cited
UNITED STATES PATENTS

| | | |
|---|---|---|
| 1,359,115 | 11/1920 | Sittinger .................................. 35/70 |
| 1,492,671 | 5/1924 | Bruel .................................. 35/69 X |
| 1,613,204 | 1/1927 | Smith .............................. 35/35 H X |
| 2,481,109 | 9/1949 | Grace .................................. 35/9 R |
| 2,769,640 | 11/1956 | Elder .............................. 36/31 G X |
| 3,403,460 | 10/1968 | Barrows ............................. 35/70 X |

*Primary Examiner*—Wm. H. Grieb
*Attorney, Agent, or Firm*—John E. Wilson, Esq.

[57] ABSTRACT

A device which helps slow learners to become informed and improve manual dexterity. A student indicates answers to a series of questions by placing blocks at the proper place on a board, the blocks being decorated so that when all of the questions have been properly answered an image will be completed.

8 Claims, 9 Drawing Figures

PATENTED AUG 6 1974 3,827,160

EDUCATIONAL DEVICE

BACKGROUND OF THE INVENTION

There are many situations where the conventional methods of teaching are not sufficiently effective. For example, there are vast numbers of young people who are environmentally retarded. Their home life and surroundings are such that they are not motivated to learn and/or are not given sufficient opportunity to acquire knowledge.

Still other students have difficulty in learning because they have sustained brain damage. Such a person requires motivation and encouragement. Attempting to learn through available methods where the teacher tries to impart knowledge by lecture is discouraging to the student and teacher alike because the student knows he has difficulty in learning and the acquisition of knowledge is not rewarding enough to justify the extreme effort necessary.

As the slow learner becomes aware of his slow progress, he resists the efforts of his teacher, regarding the teacher as one who is constantly pointing out mistakes or shortcomings. The entire learning process usually becomes extremely painful to those who are unfortunate enough to have difficulty in learning.

SUMMARY OF THE INVENTION

It is an object of the present invention to overcome drawbacks found in the prior art, such as those discussed above. Accordingly, a number of cards are provided with each card indicating one of a number of questions and one of a number of designs so that the cards can be selected one by one, and as a particular card is selected, a game piece having on it a design identical to the one shown on said particular card can be placed on an answer board at a location indicating the answer to the question on said particular card, repetition of this procedure resulting eventually in the completion of an image on the answer board.

DETAILED DESCRIPTION OF THE PREFERRED EMBODIMENT

FIGS. 1 through 6 each show a question card. In each instance, the card poses an arithmetic problem and each card in the lower right hand corner shows a design in one or more colors. The drawings, of course, are in black and white and therefore shade lines are used to indicate the presence of the different colors. Taken together, the cards of FIGS. 1 through 6 are a means of indicating a series of questions to a student who can select them one by one.

Figure 1:
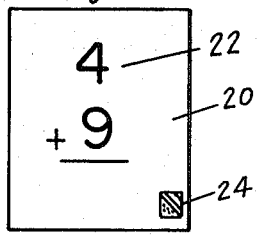
FIG. 1 is a card made in accordance with the present invention having printed on it an arithmetic problem and a design at the lower right hand corner.
Figure 2:
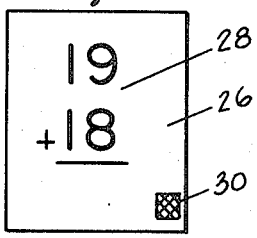
FIGS. 2 through 6 are other cards made in accordance with the present invention, each having an arithmetic problem and a design.
Figure 3:
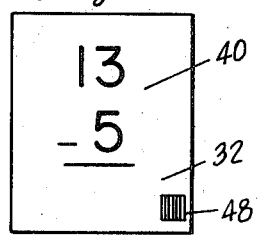
Figure 4:
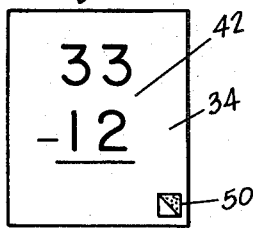
Figure 5:
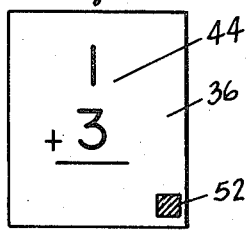
Figure 6:
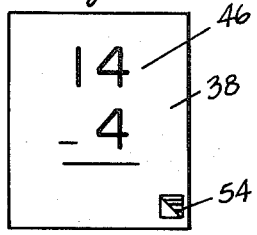

Thus, FIG. 1 shows a question card 20 having an arithmetic problem 22 and a design 24 in the lower right hand corner. The card poses the problem of finding the sum of four plus nine. A card 26 of FIG. 2 has printed on it an arithmetic problem 28 and at its lower right hand corner a design 30. Similarly, FIGS. 3 through 6 show cards 32, 34, 36 and 38 respectively with arithmetic problems 40, 42, 44 and 46 respectively. The cards have at their lower right hand corner designs 48, 50, 52 and 54 respectively. The student has many playing cards and it is possible that cards with different problems could have the same answer. For instance, one card could pose the problem of finding the sum of five plus five. Another card could pose the problem of adding six plus four. The solution to both these problems, of course, is ten. If several cards have the same answer, they have the same design in their lower right hand corner.

Figure 7:
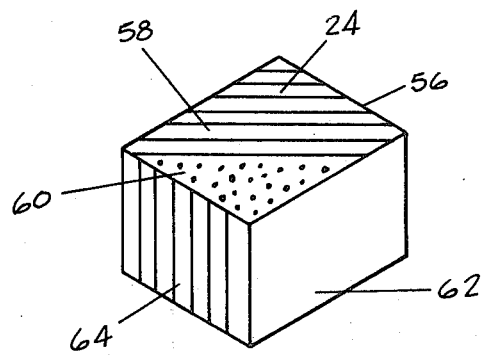
FIG. 7 is a game piece having on its faces several of the designs shown on the question cards.

The student is provided with a number of game pieces in the form of blocks such as the cube shown in FIG. 7. In FIG. 7, a cube 56 has an upper face which in the preferred embodiment is square and has a design of two contiguous triangles 58 and 60 which are defined by the outline of the upper square face of the block 56 and one diagonal, and which are of different colors. It is the same design 24 as the one shown in the lower right hand corner of the card 20 of FIG. 1. The left front face 64 has a design identical to the design 48 of FIG. 3. Thus the block 56 could have all of the designs shown on the cards of FIG. 1–6 because it has six faces. Since there must be a design on a cube for each answer to a question posed by the question cards, if there are more than six correct answers, then cubes having other designs on their faces must be provided.

Figure 8:
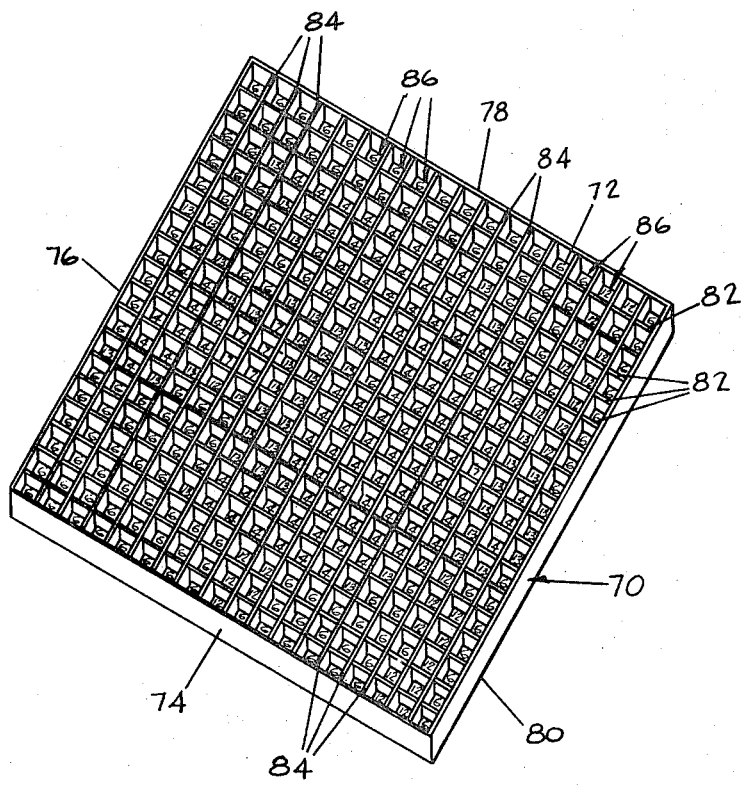
FIG. 8 is a perspective view of an answer board where game pieces are placed to complete an image.

The student has, in addition to the question cards and blocks, a game board. A game board 70 is shown in FIG. 8. It has a flat bottom 72 and raised sides 74, 76, 78 and 80. The board has a number of parallel dividers 82 extending equidistant from each other and parallel to the sides 74 and 78. The board 70 also has a number of dividers 84 which are parallel to one another and extend parallel to the sides 76 and 80. In the preferred embodiment, the dividers 84 are spaced apart the same distance as are the dividers 82 so that the dividers 82 and 84 define a number of square receptacles 86 on the board 70. The particular dividers 82 which are closest to the sides 74 and 78 and the particular dividers 84 which are closest to the sides 76 and 80 are spaced from their adjacent sides the same distance as that between parallel dividers so that all of the receptacles 86, including those contiguous to the sides 74, 76, 78 and 80, are the same size.

At the square area at the bottom of each of the square receptacles on the board 80, there is indicated an answer to one of the questions posed on one or more of the question cards available to the student, such as a question on one of the cards 20, 26, 32, 34, 36 or 38.

As an example of how the present educational device is used by a student, consider what happens when the student picks the question card 20 shown in FIG. 1. The question posed is: How much is nine plus four? The card 20 indicates in its lower right hand corner a square design 24 corresponding to the colored upper face of one of the blocks 56. The student takes one of the blocks 56 and places it in a receptacle 86 of the question board 70 which has at its bottom the number thirteen with the triangles 58 and 60 facing upwardly. The effect is to cover the answer to the question posed on card 20 with the design shown by that card. When all of the receptacles 86 are filled with blocks so that any given block is placed and oriented so that the design which is visible covers on the answer board the proper answer to a question posed on a card having an identical design, an image, such as the fish shown in FIG. 9, will be completed. This is so because of the placement of the answers on the answer board 70.

Each answer, of course, is properly covered with a block placed to show only one particular design. In other words, each answer is properly matched with only one particular design. It is possible however, that a particular design may be properly matched with more than one correct answer on the answer board 70. For example, the fish 90 of FIG. 9 may be made up partly of designs 52 of a solid color and designs 24. The designs 24 are found on the upper faces of blocks 56 as shown in FIG. 7. The card 20 of FIG. 1 shows the design 24 and poses a question which is properly answered "thirteen." A block 56 should, therefore, be placed over any receptacle having that answer at the bottom and oriented so that the design 24 appears on the top face. It is also possible that question cards having other proper answers would show the design 24. Blocks 56 would be properly placed over those answers and oriented to show the design 24.

The blocks 56 must also be oriented so that they correctly outline the fish 90, that is, so that the colored triangle in the design 24 which is supposed to be part of the fish 90 is part of the fish and the triangle of the design 24 which is the color of the background, in fact becomes part of the background.

Figure 9:
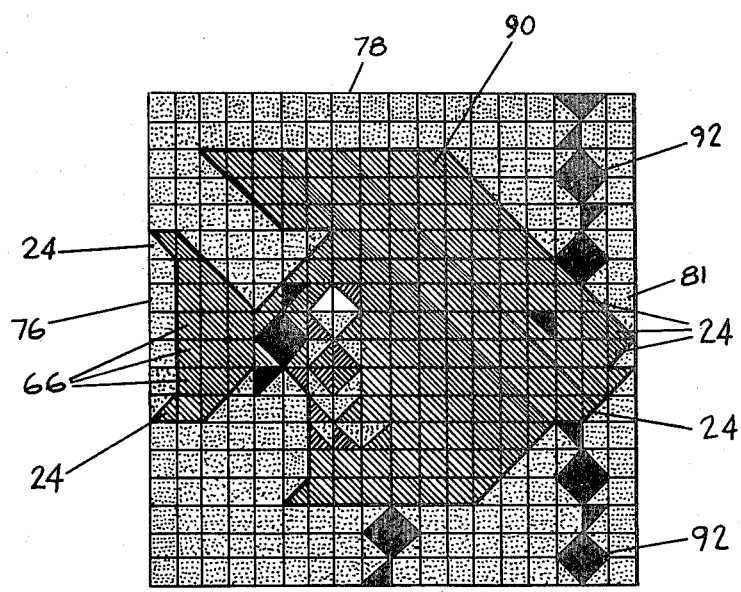
FIG. 9 shows the answer board of FIG. 8 but with an image completed by the proper placement of game pieces.

The image which appears after the answer board is properly covered with blocks depends, of course, on the manner in which the answers are arranged. FIG. 8 shows an arrangement which will result in the fish of FIG. 9. It is possible to include more than one figure or to have ornamentation which is not a recognizable figure. For example, fish 90 which includes besides designs 24 and 52, designs of other colors which are indicated by several styles of cross-hatching in FIG. 9 is not the only thing appearing in the image. The image includes blocks 92 which while not comprising part of the fish 90 makes up part of the completed image.

The preferred embodiment used for illustration has question cards which pose arithmetic problems and an answer board 70 which has corresponding arithmetic answers. It would be just as easy to pose on the question cards questions of any subject and have suitable answers on the answer board. It is contemplated that the present invention would be used best when a number of answer boards were available each with suitable question cards.

It is also possible to use game pieces which show only one design. However, the preferred embodiment uses six sided game pieces because they force the student to orient them properly. This exercise improves manual dexterity. When the image has been completed, it can be covered with a transparent cover or displayed as it is to symbolize to the student his advancement in learning. The student has something to show for his mental achievement and has enjoyed the learning process enough to be motivated to work on other answer boards, answer other questions and complete other images.

The foregoing describes but one preferred embodiment of the present invention, other embodiments being possible without exceeding the scope of the present invention as defined in the following claims.

What is claimed is:

1. An educational device comprising:
   means to indicate a plurality of questions and a plurality of designs, with each question having a corresponding design;
   a plurality of game pieces, each of said game pieces indicating one of said designs; and
   an answer board having a plurality of areas, each of said areas indicating an answer to one of said questions, said answers being arranged in relation to each other so that an image appears when said means to indicate said plurality of questions and corresponding designs is operated and as a given question is posed, a game piece indicating the design corresponding to said given question is placed on said answer board on one of said areas indicating an answer to that question so that the design is visible but the answer to said given question is covered until the answer board is filled with game pieces.

2. The educational device defined in claim 1 wherein said game pieces are in the shape of cubes and each have one of said designs on each face.

3. The educational device defined in claim 1 wherein said areas are rectangular in shape.

4. The educational device defined in claim 1 wherein said areas are defined by receptacles on said game board.

5. The educational device defined in claim 4 wherein said receptacles are defined by a plurality of intersecting dividers.

6. The educational device defined in claim 5 wherein said receptacles are square in plan.

7. The educational device defined in claim 6 wherein said questions are arithmetic problems and said answers are numbers.

8. The educational device defined in claim 7 wherein said means to indicate a plurality of questions and corresponding designs comprises a plurality of cards each card indicating a question and a corresponding design.

* * * * *